United States Patent
Ando et al.

(10) Patent No.: US 11,441,528 B2
(45) Date of Patent: Sep. 13, 2022

(54) VEHICLE AND PORTABLE DEVICE

(71) Applicant: TOYOTA JIDOSHA KABUSHIKI KAISHA, Toyota (JP)

(72) Inventors: Yuya Ando, Toyota (JP); Takeaki Suzuki, Toyota (JP); Shinsuke Iwasaki, Toyota (JP); Miki Sugita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/573,306

(22) Filed: Sep. 17, 2019

(65) Prior Publication Data
US 2020/0132034 A1    Apr. 30, 2020

(30) Foreign Application Priority Data
Oct. 29, 2018  (JP) .............................. JP2018-202516

(51) Int. Cl.
| F02N 11/08 | (2006.01) |
| B60L 53/18 | (2019.01) |
| B60R 25/01 | (2013.01) |
| B60R 25/40 | (2013.01) |
| B60W 10/26 | (2006.01) |

(52) U.S. Cl.
CPC .......... *F02N 11/0866* (2013.01); *B60L 53/18* (2019.02); *B60R 25/01* (2013.01); *B60R 25/403* (2013.01); *B60W 10/26* (2013.01)

(58) Field of Classification Search
CPC ...... F02N 11/0866; B60L 53/18; B60R 25/01; B60R 25/403; B60R 25/40; B60R 16/033; B60W 10/26; Y02T 90/14; Y02T 10/7072; Y02T 10/70; H02J 7/0063
See application file for complete search history.

(56) References Cited

U.S. PATENT DOCUMENTS

| 6,093,980 | A * | 7/2000 | Yamamoto | ............. B60R 25/24 307/10.3 |
| 7,545,258 | B2 * | 6/2009 | Endo | ..................... B60R 25/042 340/426.11 |
| 8,843,091 | B2 * | 9/2014 | Murakami | .......... B60C 23/0435 455/151.2 |
| 8,978,109 | B2 * | 3/2015 | Hirashima | .......... H04L 63/0853 726/4 |
| 9,076,274 | B2 * | 7/2015 | Kamiya | ............. G07C 9/00309 |
| 10,160,325 | B2 * | 12/2018 | Lee | ...................... F02N 11/087 |
| 10,294,699 | B2 * | 5/2019 | Kowalewski | ........... E05B 81/80 |

(Continued)

FOREIGN PATENT DOCUMENTS

| DE | 19755093 A1 | 6/1999 |
| DE | 102004039187 A1 | 2/2006 |

(Continued)

*Primary Examiner* — Jared Fureman
*Assistant Examiner* — Michael J Warmflash
(74) *Attorney, Agent, or Firm* — Sughrue Mion, PLLC

(57) ABSTRACT

A vehicle includes an electric power reception unit that is configured to receive electric power that is required to activate a system of the vehicle, from a portable device that is portable, the portable device including an electrical storage device provided therein, and the portable device being configured to carry out at least one of authentication of a user of the vehicle and issuance of a command to activate the system.

6 Claims, 10 Drawing Sheets

(56) References Cited

U.S. PATENT DOCUMENTS

| | | | |
|---|---|---|---|
| 10,403,071 B2* | 9/2019 | Endo | B60R 25/24 |
| 2012/0299538 A1* | 11/2012 | Arai | H02J 7/0013 |
| | | | 320/108 |
| 2014/0230499 A1* | 8/2014 | Tokoro | E05B 81/00 |
| | | | 70/267 |
| 2014/0316612 A1 | 10/2014 | Banter et al. | |
| 2016/0325710 A1* | 11/2016 | Honkanen | B60R 25/209 |
| 2017/0089104 A1* | 3/2017 | Kowalewski | B60R 25/403 |
| 2017/0101076 A1* | 4/2017 | Krishnan | E05B 77/00 |
| 2017/0158058 A1* | 6/2017 | Lee | F02N 11/087 |
| 2017/0327079 A1* | 11/2017 | Grossmann | B60R 25/245 |

FOREIGN PATENT DOCUMENTS

| | | | | |
|---|---|---|---|---|
| DE | 102009013650 A1 | 9/2010 | | |
| EP | 1564689 A2 | 8/2005 | | |
| GB | 2496847 A * | 5/2013 | | B60R 25/24 |
| GB | 2496847 A | 5/2013 | | |
| JP | 09-037475 A | 2/1997 | | |
| JP | 2003-070175 A | 3/2003 | | |
| JP | 2012-115056 A | 6/2012 | | |
| JP | 2012-237133 A | 12/2012 | | |
| JP | 2012237133 A * | 12/2012 | | |
| JP | 2017-104000 A | 6/2017 | | |

* cited by examiner

VEHICLE AND PORTABLE DEVICE

INCORPORATION BY REFERENCE

The disclosure of Japanese Patent Application No. 2018-202516 filed on Oct. 29, 2018 including the specification, drawings and abstract is incorporated herein by reference in its entirety.

BACKGROUND

1. Technical Field

The disclosure relates to a vehicle and a portable device.

2. Description of Related Art

Conventionally, there has been proposed a vehicle that includes a battery that supplies electric power to an electric power supply ECU and various ECUs, and that is configured such that the electric power supply ECU has a control unit and an electric power supply cutoff circuit provided between the battery and the various ECUs (e.g., see Japanese Patent Application Publication No. 2003-70175 (JP 2003-70175 A)). In this vehicle, upon the lapse of an electric power supply cutoff period (e.g., 30 days) after the parking of the vehicle, the control unit of the electric power supply ECU controls the electric power supply cutoff circuit such that no electric power is supplied from the battery to the various ECUs. Thus, the electric power of the battery is restrained from being consumed.

SUMMARY

In the case where the vehicle has been left unattended for a long time, even when the supply of electric power from the battery to the various ECUs is cut off as described above, the battery may become dead. When the battery becomes dead, the electric power of the battery cannot be used to activate a system. As a countermeasure against this, it is conceivable to further restrain the electric power of the battery from being consumed by cutting off the supply of electric power from the battery to the electric power supply ECU as well, with a view to restraining the battery from becoming dead. However, when the supply of electric power from the battery to the electric power supply ECU is cut off in the above-mentioned vehicle, there is no means for activating the electric power supply ECU afterward, so the system cannot be activated. On such occasions, there have been demands to enable easy activation of the system without requesting support from an operator or connecting the battery of the own vehicle to a battery of another vehicle (a rescue vehicle) through the use of a cable.

A vehicle according to an aspect of the disclosure and a portable device according to another aspect of the disclosure make it possible to easily activate a system of the vehicle even in the case where the vehicle has been left unattended for a long time.

The vehicle and the portable device according to the aspects of the disclosure have the following configurations.

The vehicle according to the aspect of the disclosure includes an electric power reception unit that is configured to receive electric power that is required to activate a system of the vehicle, from a portable device that is portable, the portable device including an electrical storage device provided therein, and the portable device being configured to carry out at least one of authentication of a user of the vehicle and issuance of a command to activate the system.

Owing to the aforementioned configuration, the system can be activated through the use of the electric power from the electrical storage device of the portable device. As a result, the system of the vehicle can be easily activated even in the case where the vehicle has been left unattended for a long time.

In the vehicle according to the aforementioned aspect of the disclosure, the electric power reception unit may include at least one of an exterior insertion portion which is provided outside a vehicle cabin and into which the portable device is inserted, an interior insertion portion which is provided inside the vehicle cabin and into which the portable device is inserted, a placement portion that is provided inside the vehicle cabin and onto which the portable device is placed, and a non-contact electric power reception portion that is configured to receive the electric power from the portable device in a non-contact manner. Owing to the aforementioned configuration, when the portable device is inserted into the exterior insertion portion or the interior insertion portion or placed onto the placement portion, electric power can be received from the portable device, or electric power can be received from the portable device in a non-contact manner.

Besides, in the vehicle according to the aforementioned aspect of the disclosure, the electric power reception unit may be configured to receive the electric power from the portable device and feed the electric power to the portable device. Besides, the vehicle may further include an electric power feed unit that is configured to feed the electric power to the portable device. In these cases, the electrical storage device of the portable device can be charged by feeding electric power from the vehicle to the portable device.

Furthermore, the vehicle according to the aforementioned aspect of the disclosure may further include an in-vehicle electrical storage device, an activation unit that is configured to activate the system, and a relay that connects and disconnects the in-vehicle electrical storage device and the activation unit to and from each other by being turned on and off, and the electric power reception unit may be configured to receive, from the portable device, the electric power for turning on the relay. Owing to the aforementioned configuration, when the relay is supplied with the electric power of the electrical storage device of the portable device via the electric power reception unit and turned on, electric power can be fed from the in-vehicle electrical storage device to the activation unit, and the system can be activated. "The activation unit" may include pieces of equipment that are needed to activate the system, and a control device that controls the pieces of equipment.

The portable device according to the aspect of the disclosure includes an electrical storage device. The portable device is portable, and is configured to carry out at least one of authentication of a user of a vehicle and issuance of a command to activate a system of the vehicle. The portable device is configured to feed electric power to the vehicle including an electric power reception unit that is configured to receive the electric power that is required to activate the system of the vehicle.

In the portable device according to the aforementioned aspect of the disclosure, electric power can be fed to the vehicle including the electric power reception unit that is configured to receive the electric power that is required to activate the system, so the system can be activated through the use of the electric power from the electrical storage device of the portable device. As a result, even in the case where the vehicle has been left unattended for a long time, the system of the vehicle can be easily activated.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

Next, a mode for carrying out the disclosure will be described through the use of the embodiment thereof.

Figure 1:
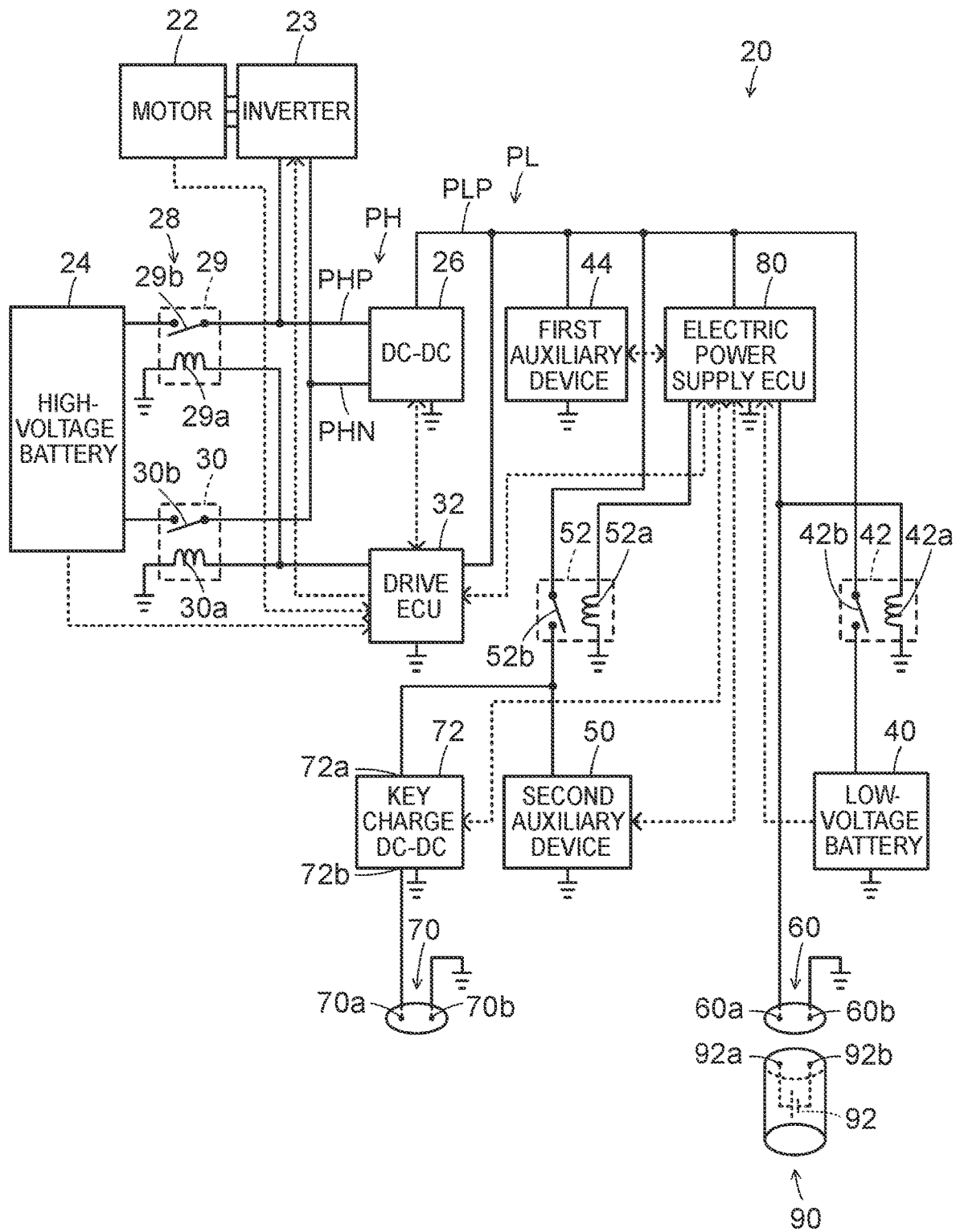
FIG. 1 is a configuration view showing the outline of the configurations of an automobile 20 and a smart key 90 according to the embodiment of the disclosure.

FIG. 1 is a configuration view showing the outline of the configurations of an automobile (an example of a vehicle) 20 and a smart key 90 according to the embodiment of the disclosure. The automobile 20 according to the embodiment is configured as an electric automobile or a hybrid automobile. As shown in the drawing, the automobile 20 includes a motor 22, an inverter 23, a high-voltage battery 24, a DC-DC converter 26, a system main relay 28, a drive electronic control unit (hereinafter referred to as "a drive ECU") 32, a low-voltage battery 40 as an in-vehicle electrical storage device, a main electric power supply relay 42, a first auxiliary device 44, a second auxiliary device 50, a subsidiary electric power supply relay 52, key slots 60 and 70, a key charge DC-DC converter 72, and an electric power supply electronic control unit (hereinafter referred to as "an electric power supply ECU") 80.

The motor 22 is configured as, for example, a synchronous generator-motor, and outputs motive power for running. The inverter 23 is used to drive the motor 22, and is connected to a positive electrode line PHP and a negative electrode line PHN of a high voltage-side electric power line PH. The motor 22 is rotationally driven through the performance of switching control of a plurality of switching elements of the inverter 23 by the drive ECU 32. The high-voltage battery 24 is configured as a lithium-ion secondary battery or a nickel hydride secondary battery with a rated voltage of about several hundreds of V.

A first positive electrode terminal and a first negative electrode terminal of the DC-DC converter 26 are connected to the positive electrode line PHP and the negative electrode line PHN of the high voltage-side electric power line PH respectively. A second positive electrode terminal of the DC-DC converter 26 is connected to a positive electrode line PLP of a low voltage-side electric power line PL. A second negative electrode terminal of the DC-DC converter 26 is grounded to a vehicle body that is made of metal. In the embodiment, the vehicle body is used as a negative electrode line PLN of the low voltage-side electric power line PL. Accordingly, "being grounded to the vehicle body" is synonymous with "being connected to the negative electrode line PLN of the low voltage-side electric power line PL". This DC-DC converter 26 steps down the electric power of the high voltage-side electric power line PH and supplies the low voltage-side electric power line PL therewith.

The system main relay 28 includes a positive electrode relay 29 and a negative electrode relay 30. The positive electrode relay 29 is configured as a normal open-type electromagnetic relay, and connects and disconnects a positive electrode terminal of the high-voltage battery 24 and the positive electrode line PHP of the high voltage-side electric power line PH to and from each other by being turned on and off. This positive electrode relay 29 includes a coil 29a and an operation portion 29b. The coil 29a is connected at one end thereof to the drive ECU 32, and is grounded at the other end thereof to the vehicle body. The operation portion 29b connects the positive electrode terminal of the high-voltage battery 24 and the positive electrode line PHP of the high voltage-side electric power line PH to each other when the coil 29a is in its energized state, and disconnects the positive electrode terminal of the high-voltage battery 24 and the positive electrode line PHP of the high voltage-side electric power line PH from each other when the coil 29a is in its non-energized state.

The negative electrode relay 30 is configured as a normal open-type electromagnetic relay, and connects and disconnects a negative electrode terminal of the high-voltage battery 24 and the negative electrode line PHN of the high voltage-side electric power line PH to and from each other by being turned on and off. This negative electrode relay 30 includes a coil 30a and an operation portion 30b. The coil 30a is connected at one end thereof to the drive ECU 32, and is grounded at the other end thereof to the vehicle body. The operation portion 30b connects the negative electrode terminal of the high-voltage battery 24 and the negative electrode line PHN of the high voltage-side electric power line PH to each other when the coil 30a is in its energized state, and disconnects the negative electrode terminal of the high-voltage battery 24 and the negative electrode line PHN of the high voltage-side electric power line PH from each other when the coil 30a is in its non-energized state.

Although not shown in the drawing, the drive ECU 32 is configured as a microprocessor that is mainly constituted of a CPU. In addition to the CPU, the drive ECU 32 includes a ROM that stores a processing program, a RAM that temporarily stores data, input and output ports, and a communication port. A positive electrode terminal of this drive ECU 32 is connected to the positive electrode line PLP of the low voltage-side electric power line PL, and a negative electrode terminal of this drive ECU 32 is grounded to the vehicle body. The drive ECU 32 operates upon being fed with electric power from the low voltage-side electric power line PL.

Signals from a sensor that detects a state (e.g., a rotational position of a rotor or a phase current) of the motor 22, a sensor that detects a state (e.g., a voltage or a current) of the high-voltage battery 24, a sensor that detects a state (e.g., a voltage of the high voltage-side electric power line PH or a voltage of the low voltage-side electric power line PL) of the DC-DC converter 26, and the like are input to the drive ECU 32 via the input ports thereof respectively. Various control signals to the inverter 23, the DC-DC converter 26, and the like are output from the drive ECU 32 via the output ports thereof respectively. The drive ECU 32 controls the on and off states of the positive electrode relay 29 and the negative electrode relay 30 by rendering the coils 29a and 30a in their energized or non-energized states.

The drive ECU 32 computes an electrical storage ratio SOCH of the high-voltage battery 24 based on an input and output current of the high-voltage battery 24 from a current sensor. Besides, the drive ECU 32 is connected to an electric power supply ECU 80 via the communication port.

The low-voltage battery 40 is configured as a lead storage battery with a rated voltage of, for example, 12 V. A negative electrode terminal of the low-voltage battery 40 is grounded to the vehicle body. The main electric power supply relay 42 is configured as a ratchet electromagnetic relay that needs a current to be turned on and off and that does not need any current to be held on and off. The main electric power supply relay 42 connects and disconnects the positive electrode terminal of the low-voltage battery 40 and the positive electrode line PLP of the low voltage-side electric power line PL to and from each other by being turned on and off. This main electric power supply relay 42 includes a coil 42a and an operation portion 42b. The coil 42a is connected at one end thereof to the electric power supply ECU 80, and is grounded at the other end thereof to the vehicle body. The operation portion 42b connects the positive electrode terminal of the low-voltage battery 40 and the positive electrode line PLP of the low voltage-side electric power line PL to each other when the coil 42a shifts from its non-energized state to its energized state, holds the positive electrode terminal of the low-voltage battery 40 and the positive electrode line PLP of the low voltage-side electric power line PL connected to each other even when the coil 42a shifts from its energized state to its non-energized state afterward, disconnects the positive electrode terminal of the low-voltage battery 40 and the positive electrode line PLP of the low voltage-side electric power line PL from each other when the coil 42a shifts from its non-energized state to its energized state afterward, and holds the positive electrode terminal of the low-voltage battery 40 and the positive electrode line PLP of the low voltage-side electric power line PL disconnected from each other even when the coil 42a shifts from its energized state to its non-energized state. That is, the main electric power supply relay 42 is turned on or off every time the coil 42a shifts from its non-energized state to its energized state.

A positive electrode terminal of the first auxiliary device 44 is connected to the positive electrode line PLP of the low voltage-side electric power line PL, and a negative electrode terminal of the first auxiliary device 44 is grounded to the vehicle body. For example, an auxiliary device concerning protection against theft and security of the automobile 20 (e.g., a horn, a hazard flasher, or the like), a door lock device that locks and unlocks doors of the automobile 20, or the like can be mentioned as the first auxiliary device 44. A negative electrode terminal of the second auxiliary device 50 is grounded to the vehicle body. For example, an audio system, a power window, a navigation device, or the like can be mentioned as the second auxiliary device 50.

The subsidiary electric power supply relay 52 is configured as a normal open-type electromagnetic relay, and connects and disconnects a positive electrode terminal of the second auxiliary device 50 and a first positive electrode terminal 72a of the key charge DC-DC converter 72 to and from the positive electrode line PLP of the low voltage-side electric power line PL by being turned on and off. This subsidiary electric power supply relay 52 includes a coil 52a and an operation portion 52b. The coil 52a is connected at one end thereof to the electric power supply ECU 80, and is grounded at the other end thereof to the vehicle body. The operation portion 52b connects the positive electrode terminal of the second auxiliary device 50 and the first positive electrode terminal 72a of the key charge DC-DC converter 72 to the positive electrode line PLP of the low voltage-side electric power line PL when the coil 52a is in its energized state, and disconnects the positive electrode terminal of the second auxiliary device 50 and the positive electrode line PLP of the low voltage-side electric power line PL from each other when the coil 52a is in its non-energized state.

Figure 2:
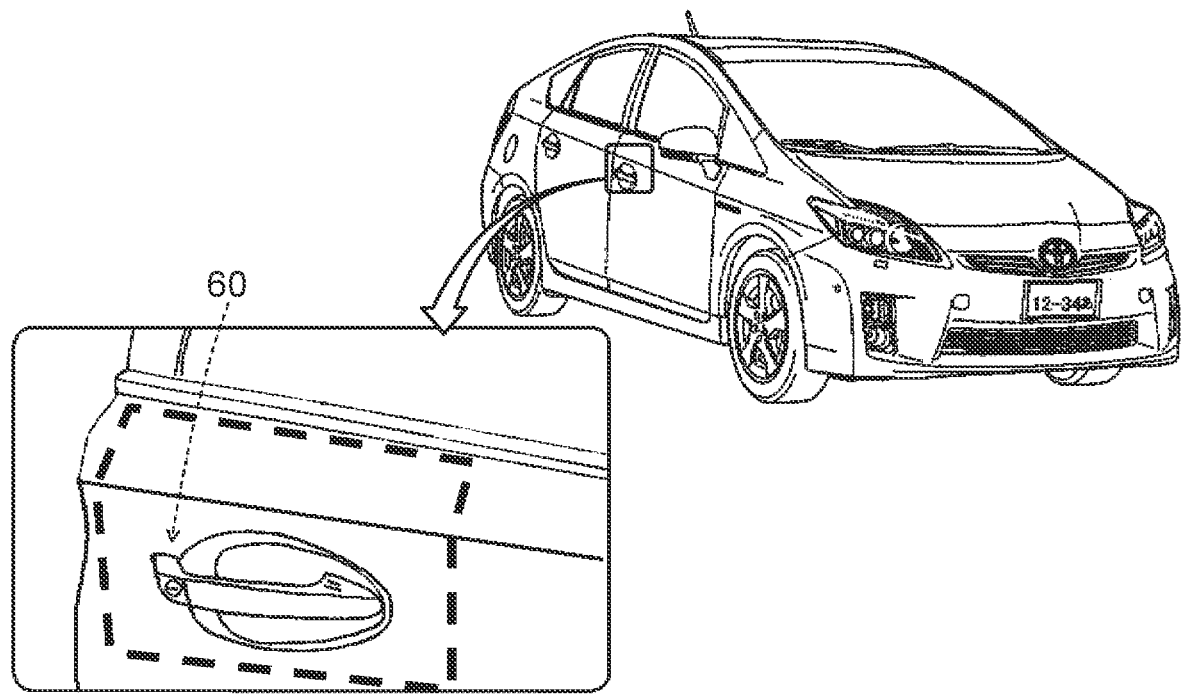
FIG. 2 is an illustrative view showing a position where a key slot 60 is provided.

The key slot 60 is provided outside a vehicle cabin, and is configured such that the smart key 90 is inserted thereinto. A positive electrode terminal 60a and a negative electrode terminal 60b of the key slot 60 are exposed. The positive electrode terminal 60a is connected to one end of the coil 42a of the main electric power supply relay 42 and the electric power supply ECU 80, and the negative electrode terminal 60b is grounded to the vehicle body. FIG. 2 is an illustrative view showing a position where the key slot 60 is provided. The key slot 60 is provided around a door handle as indicated by, for example, a region surrounded by a broken line in FIG. 2.

Figure 3:
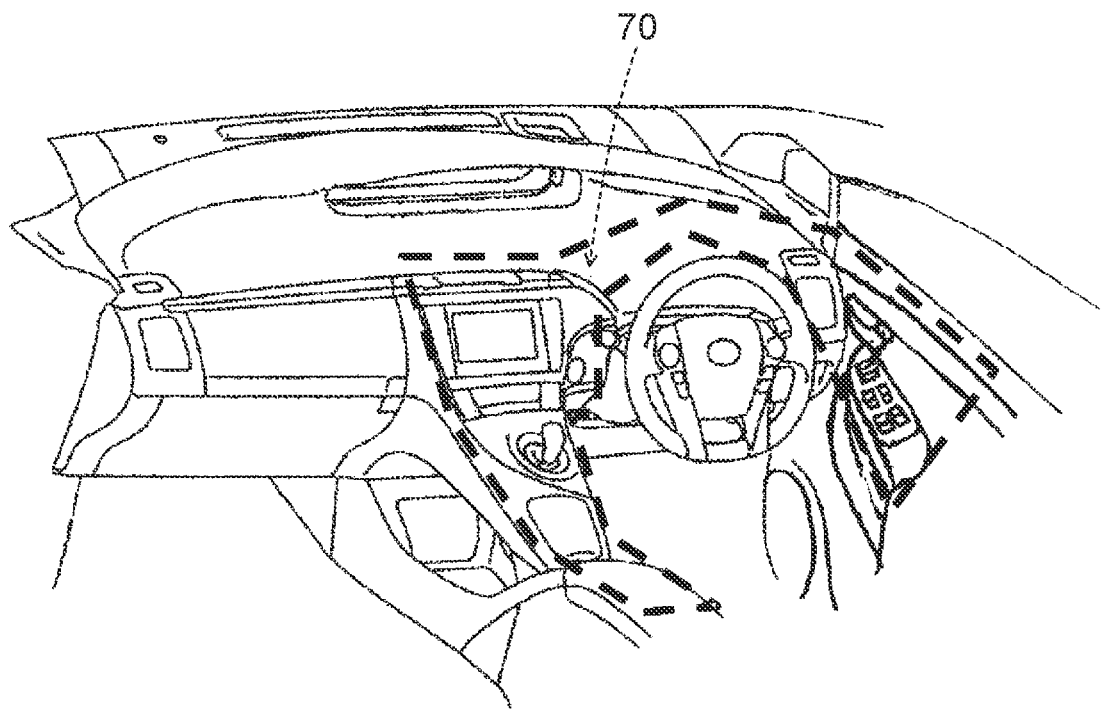
FIG. 3 is an illustrative view showing a position where a key slot 70 is provided.

The key slot 70 is provided inside the vehicle cabin, and is configured such that the smart key 90 is inserted thereinto. A positive electrode terminal 70a and a negative electrode terminal 70b of the key slot 70 are exposed. The positive electrode terminal 70a is connected to the key charge DC-DC converter 72, and the negative electrode terminal 70b is grounded to the vehicle body. FIG. 3 is an illustrative view showing a position where the key slot 70 is provided. The key slot 70 is provided around a driver seat as indicated by, for example, a region surrounded by a broken line in FIG. 3.

The description of the automobile 20 will now be temporarily stopped, and the smart key 90 will be described. The smart key 90 includes a storage battery 92 as an electrical storage device provided therein, and a positive electrode terminal 92a and a negative electrode terminal 92b from the storage battery 92 are exposed. The storage battery 92 is configured as, for example, a lithium-ion secondary battery with a rated voltage of several V. When this smart key 90 is inserted into the key slots 60 and 70 in a correct direction, the positive electrode terminal 92a and the negative electrode terminal 92b of the smart key 90 come into contact with the positive electrode terminals 60a and 70a and the negative electrode terminals 60b and 70b of the key slots 60 and 70 respectively, and the automobile 20 and the smart key 90 are electrically connected to each other. An ID corresponding to the automobile 20 is stored in the smart key 90. Besides, the smart key 90 can communicate with the electric power supply ECU 80 of the automobile 20 in a wireless manner.

The description of the automobile 20 will be resumed. The first positive electrode terminal 72a of the key charge DC-DC converter 72 as well as the positive electrode terminal of the second auxiliary device 50 is connected to the positive electrode line PLP of the low voltage-side electric power line PL via the subsidiary electric power supply relay 52 (the operation portion 52b), a second positive electrode terminal 72b of the key charge DC-DC converter 72 is connected to the positive electrode terminal 70a of the key slot 70, and a negative electrode terminal of the key charge DC-DC converter 72 is grounded to the vehicle body. This key charge DC-DC converter 72 steps down the electric power of the low voltage-side electric power line PL, and supplies the key slot 70 therewith when the subsidiary electric power supply relay 52 is on.

Although not shown in the drawing, the electric power supply ECU 80 is configured as a microprocessor that is mainly constituted of a CPU. In addition to the CPU, the electric power supply ECU 80 includes a ROM that stores a processing program, a RAM that temporarily stores data, input and output ports, and a communication port. A positive electrode terminal of this electric power supply ECU 80 is connected to the positive electrode line PLP of the low voltage-side electric power line PL, and a negative electrode terminal of this electric power supply ECU 80 is grounded to the vehicle body. The electric power supply ECU 80 operates upon being fed with electric power from the low voltage-side electric power line PL. A vehicle-side ID for authenticating a user is stored in the ROM of the electric power supply ECU 80.

Signals from a sensor that detects a state (e.g., a voltage or a current) of the low-voltage battery 40, a sensor that detects a state (e.g., a voltage or a current) of the first auxiliary device 44, a sensor that detects a state (e.g., a voltage or a current) of the second auxiliary device 50, a sensor that detects a state (e.g., a voltage on the second auxiliary device 50 side, a voltage on the key slot 70 side, or a current on the key slot 70 side) of the key charge DC-DC converter 72, and the like are input to the electric power supply ECU 80 via the input ports thereof respectively. Various control signals to the first auxiliary device 44, the second auxiliary device 50, the key charge DC-DC converter 72, and the like are output from the electric power supply ECU 80 via the output ports thereof respectively. The electric power supply ECU 80 controls the changeover in the on and off state of the main electric power supply relay 42 by shifting the coil 42a from its non-energized state to its energized state. Besides, the electric power supply ECU 80 controls the on and off state of the subsidiary electric power supply relay 52 by rendering the coil 52a in its energized state or its non-energized state.

The electric power supply ECU 80 computes the electrical storage ratio SOCL of the low-voltage battery 40 based on an input and output current of the low-voltage battery 40 from the current sensor. Besides, as described above, the electric power supply ECU 80 is connected to the drive ECU 32 via the communication port. Furthermore, the drive ECU 32 can communicate with the smart key 90 in a wireless manner, and authenticates the user by collating a key-side ID from the smart key 90 and the vehicle-side ID stored in the ROM of the electric power supply ECU 80 with each other. This function will be referred to hereinafter as a "smart key collation function".

Figure 4:
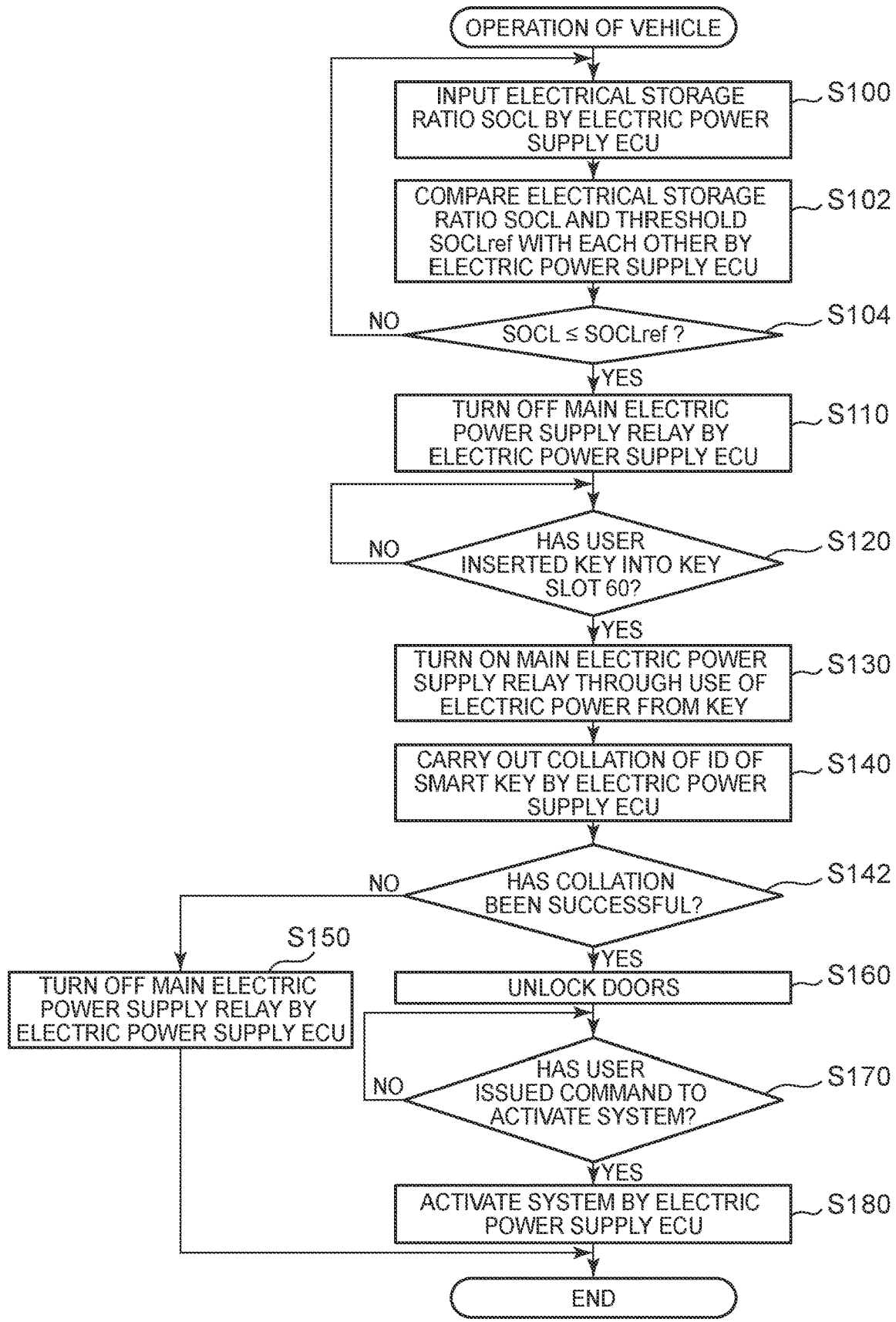
FIG. 4 is an illustrative view for illustrating the flow of operation of the automobile 20 after the automobile 20 is parked thereof.

Next, the operation of the automobile 20 according to the embodiment thus configured, especially the operation of the automobile 20 that includes been parked and left unattended for a long time will be described. FIG. 4 is an illustrative view for illustrating the flow of the operation of the automobile 20 after the automobile 20 is parked thereof.

In the flow of the operation of the automobile 20 in FIG. 4, the electric power supply ECU 80 first inputs the electrical storage ratio SOCL of the low-voltage battery 40 (step S100), and compares the input electrical storage ratio SOCL of the low-voltage battery 40 with the threshold SOCLref (steps S102 and S104). It should be noted herein that a value computed based on the input and output current of the low-voltage battery 40 from the current sensor is input as the electrical storage ratio SOCL of the low-voltage battery 40. A process of comparing the electrical storage ratio SOCL of the low-voltage battery 40 with the threshold SOCLref is a process of determining whether or not the automobile 20 has been left unattended for a long time. For example, 20%, 25%, 30%, or the like is used as the threshold SOCLref. If the electrical storage ratio SOCL of the low-voltage battery 40 is higher than the threshold SOCLref, a return to step S100 is made.

If the electrical storage ratio SOCL of the low-voltage battery 40 is equal to or lower than the threshold SOCLref in steps S102 and S104, the electric power supply ECU 80 turns off the main electric power supply relay 42 (step S110). The main electric power supply relay 42 is configured as a ratchet electromagnetic relay. Therefore, the main electric power supply relay 42 is turned off through the shifting of the coil 42a from its non-energized state to its energized state by the electric power supply ECU 80.

When the main electric power supply relay 42 is thus turned off, the positive electrode terminal of the low-voltage battery 40 and the positive electrode line PLP of the low voltage-side electric power line PL are disconnected from each other, and electric power is stopped from being fed from the low-voltage battery 40 to the positive electrode line PLP of the low voltage-side electric power line PL, namely, from being fed to the DC-DC converter 26, the drive ECU 32, the first auxiliary device 44, the electric power supply ECU 80, and the like. By stopping electric power from being fed to the electric power supply ECU 80, the coil 42a is also rendered in its non-energized state, but the main electric power supply relay 42 is held off.

After that, when the smart key 90 is inserted into the key slot 60 provided outside the vehicle cabin of the automobile 20 (e.g., in the door handle or the like) and the positive electrode terminal 92a and the negative electrode terminal 92b of the smart key 90 come into contact with the positive electrode terminal 60a and the negative electrode terminal 60b of the key slot 60 respectively (step S120), the main electric power supply relay 42 is turned on (step S130). The main electric power supply relay 42 is turned on by applying a voltage of the storage battery 92 of the smart key 90 to the coil 42a to shift the coil 42a from its non-energized state to its energized state. That is, the key slot 60 functions as an electric power reception unit that is configured to receive, from the smart key 90 (the storage battery 92), electric power for turning on the main electric power supply relay 42.

When the main electric power supply relay 42 is thus turned on, the positive electrode terminal of the low-voltage battery 40 and the positive electrode line PLP of the low voltage-side electric power line PL are connected to each other, and electric power is fed from the low-voltage battery 40 to the positive electrode line PLP of the low voltage-side electric power line PL, namely, to the DC-DC converter 26, the drive ECU 32, the first auxiliary device 44, the electric power supply ECU 80, and the like. Thus, the drive ECU 32 and the electric power supply ECU 80 are activated. Incidentally, the main electric power supply relay 42 is held on even when the user removes the smart key 90 from the key slot 60 and the coil 42a is rendered in its non-energized state.

When the drive ECU 32 and the electric power supply ECU 80 are activated, the smart key collation function of the electric power supply ECU 80 becomes effective. By communicating with the smart key 90, the electric power supply ECU 80 collates the key-side ID from the smart key 90 and the vehicle-side ID stored in the ROM of the electric power supply ECU 80 with each other (steps S140 and S142). Then, if the result of collation shows that the key-side ID from the smart key 90 and the vehicle-side ID stored in the ROM of the electric power supply ECU 80 do not coincide with each other, the electric power supply ECU 80 turns off the main electric power supply relay 42 (step S150), and the flow of the operation of the automobile 20 in FIG. 4 comes to an end.

If the result of collation in steps S140 and S142 shows that the key-side ID from the smart key 90 and the vehicle-side ID stored in the ROM of the electric power supply ECU 80 coincide with each other, the electric power supply ECU 80 causes the door lock device included in the first auxiliary device 44 of the automobile 20 to unlock the doors (step S160). Then, the electric power supply ECU 80 stands by until the user gets on the automobile and issues a command to activate the system (step S170). The command to activate the system is issued through, for example, the operation of a start switch (not shown) by the user.

When the command to activate the system is issued in step S170, the electric power supply ECU 80 activates the system (step S180), and the flow of the operation of the automobile 20 in FIG. 4 comes to an end. In activating the system, for example, the electric power supply ECU 80 turns on the subsidiary electric power supply relay 52, and the drive ECU 32 turns on the system main relay 28 (the positive electrode relay 29 and the negative electrode relay 30).

When the activation of the system is thus completed, the DC-DC converter 26 is driven by the drive ECU 32, and the electric power of the high voltage-side electric power line PH is stepped down and supplied to the low voltage-side electric power line PL. Thus, the low-voltage battery 40 is charged.

In the embodiment, the key slot 60 (the positive electrode terminal 60a and the negative electrode terminal 60b) is provided. Thus, even in the case where the drive ECU 32, the electric power supply ECU 80, and the like are stopped by turning off the main electric power supply relay 42, when the user inserts the smart key 90 into the key slot 60, the main electric power supply relay 42 is turned on through the use of the electric power of the storage battery 92 provided in the smart key 90, and the drive ECU 32 and the electric power supply ECU 80 are activated. Thus, the system can be activated. That is, even in the case where the automobile 20 has been left unattended for a long time, the system can be easily activated without requesting support from an operator or connecting the battery of the own vehicle to a battery of another vehicle (a rescue vehicle).

Figure 5:
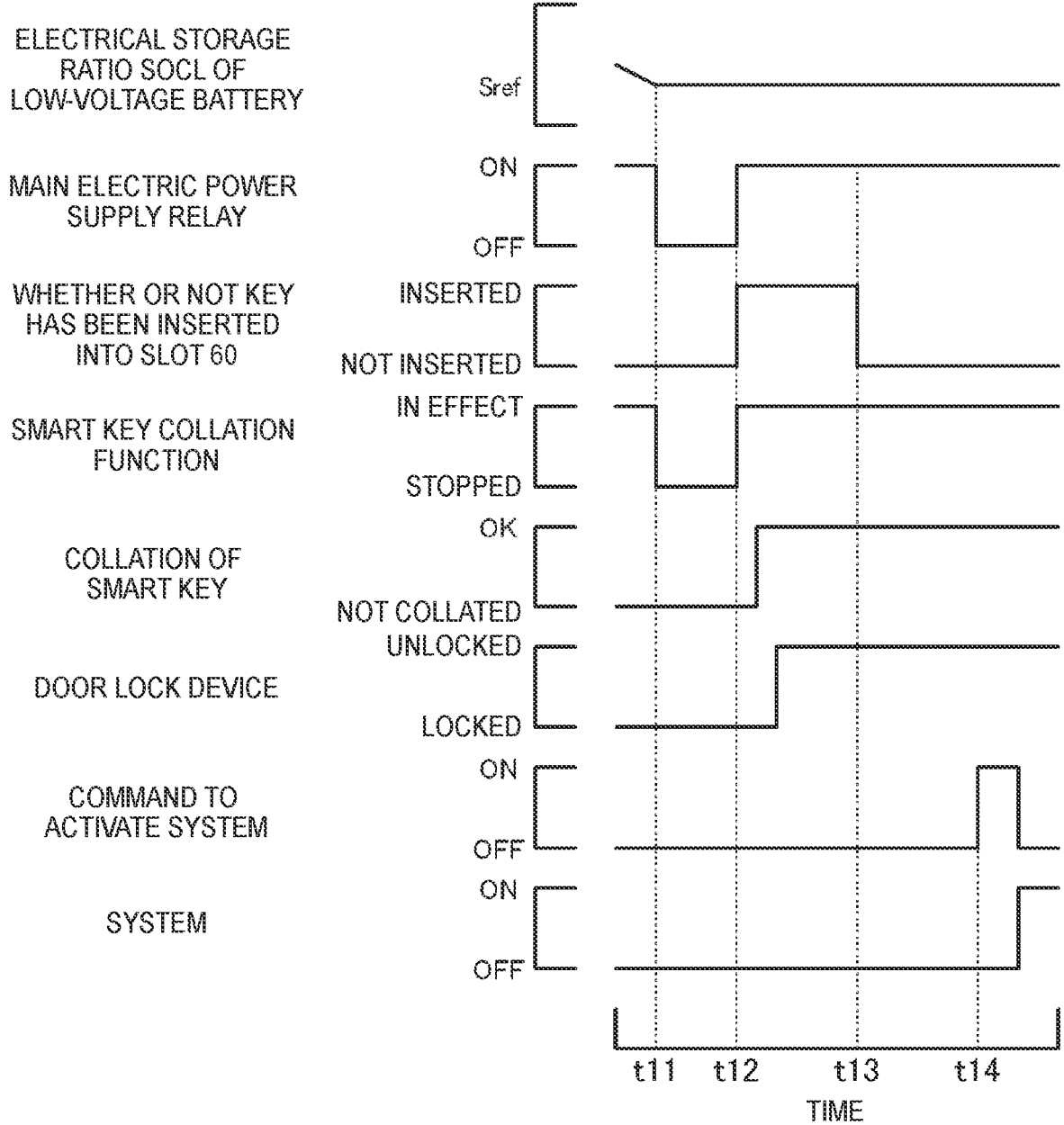
FIG. 5 is an illustrative view showing an example of how a system of the automobile 20 is activated after the automobile 20 has been left unattended for a long time.

FIG. 5 is an illustrative view showing an example of how the system of the automobile 20 is activated after the automobile 20 has been left unattended for a long time. As shown in the drawing, when the electrical storage ratio SOCL of the low-voltage battery 40 becomes equal to or lower than the threshold SOCLref after the automobile 20 has been left unattended for a long time (at a timing t11), the electric power supply ECU 80 turns off the main electric power supply relay 42. Then, the electric power supply ECU 80 (including the smart key collation function) is stopped.

After that, when the smart key 90 is inserted into the key slot 60 outside the vehicle cabin (at a timing t12), the main electric power supply relay 42 is turned on due to the electric power of the storage battery 92 of the smart key 90, and the drive ECU 32 and the electric power supply ECU 80 are activated. Then, the smart key collation function of the electric power supply ECU 80 becomes effective to collate the key-side ID and the vehicle-side ID with each other. When the result of collation is acceptable, the door lock device is caused to unlock the doors. After that, even when the user removes the smart key 90 from the key slot 60 (at a timing t13), the main electric power supply relay 42 is held on. When the user gets on the automobile and issues a command to activate the system (at a timing t14), the drive ECU 32 and the electric power supply ECU 80 activate the system.

Figure 6:
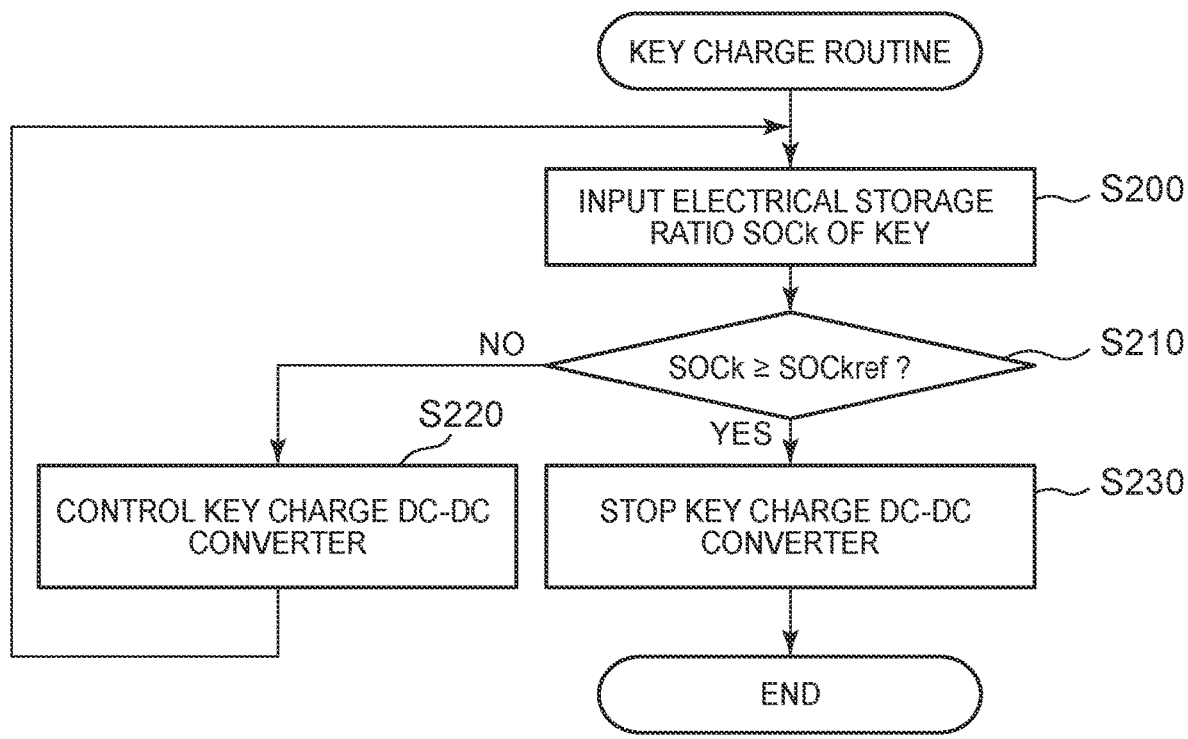
FIG. 6 is a flowchart showing an exemplary key charge routine that is executed by an electric power supply ECU 80.

Next, the operation at the time when the smart key 90 is inserted in the key slot 70 inside the vehicle cabin and the positive electrode terminal 92a and the negative electrode terminal 92b of the smart key 90 are in contact with the positive electrode terminal 70a and the negative electrode terminal 70b of the key slot 70 respectively (when this contact is detected by a sensor (not shown)) will be described. FIG. 6 is a flowchart showing an exemplary key charge routine that is executed by the electric power supply ECU 80. This routine is executed when the smart key 90 is inserted into the key slot 70 and the system has been activated (when the subsidiary electric power supply relay 52 is on).

When the key charge routine of FIG. 6 is executed, the electric power supply ECU 80 first inputs an electrical storage ratio SOCk of the storage battery 92 of the smart key 90 (step S200), and compares the input electrical storage ratio SOCk of the storage battery 92 with a threshold SOCkref (step S210). It should be noted herein that a value computed based on a voltage or current on the key slot 70 side rather than on the key charge ECU 72 side, which has been detected by a voltage sensor (not shown) or a current sensor (not shown), is input as the electrical storage ratio SOCk of the storage battery 92. The threshold SOCkref is determined as the electrical storage ratio SOCk of the storage battery 92 in its fully charged state, and 90%, 95%, 100%, or the like is used as the threshold SOCkref.

If the electrical storage ratio SOCk of the storage battery 92 is lower than the threshold SOCkref, the key charge DC-DC converter 72 is controlled such that the electric power of the low voltage-side electric power line PL is stepped down and supplied to the smart key 90 (the storage battery 92) via the key slot 70 (step S220), and a return to step S200 is made. That is, the key slot 70 and the key charge DC-DC converter 72 function as an electric power feed unit that is configured to feed electric power to the smart key 90 (the storage battery 92).

When the electrical storage ratio SOCk of the storage battery 92 becomes equal to or higher than the threshold SOCkref as a result of repeatedly carrying out the processing of steps S200 to S220 in this manner, the control of the key charge DC-DC converter 72 is stopped (step S230), and the present routine is ended. The storage battery 92 of the smart key 90 can be charged in this manner.

The automobile 20 according to the embodiment described above includes the key slot 60 (the positive electrode terminal 60a and the negative electrode terminal 60b) into which the smart key 90 is inserted and that is configured to receive, from the smart key 90, electric power for turning on the main electric power supply relay 42. Thus, when the smart key 90 is inserted into the key slot 60, the main electric power supply relay 42 is turned on due to the electric power of the storage battery 92 of the smart key 90, and the drive ECU 32 and the electric power supply ECU 80 are activated. Thus, the system can be activated. That is, even in the case where the automobile 20 has been left unattended for a long time, the system can be easily activated without requesting support from the operator or connecting the battery of the own vehicle to a battery of another vehicle (a rescue vehicle).

Besides, the automobile 20 according to the embodiment includes the key slot 70 (the positive electrode terminal 70a and the negative electrode terminal 70b) into which the smart key 90 is inserted and that is configured to feed electric power to the smart key 90. Thus, when the smart key 90 is inserted in the key slot 70, it is possible to charge the smart key 90.

In the automobile 20 according to the embodiment, it is determined whether or not the automobile 20 has been left unattended for a long time, by comparing the electrical storage ratio SOCL of the low-voltage battery 40 and the threshold SOCLref with each other. Besides, this determination may be made by comparing a period for which the automobile 20 has been left unattended and a predetermined period (e.g., about several tens of days) with each other.

In the automobile 20 according to the embodiment, a ratchet electromagnetic relay is used as the main electric power supply relay 42. Besides, as is apparent from an automobile 120 according to a modification example of FIG. 7, a latching electromagnetic relay may be used as a main electric power supply relay 142.

Figure 7:
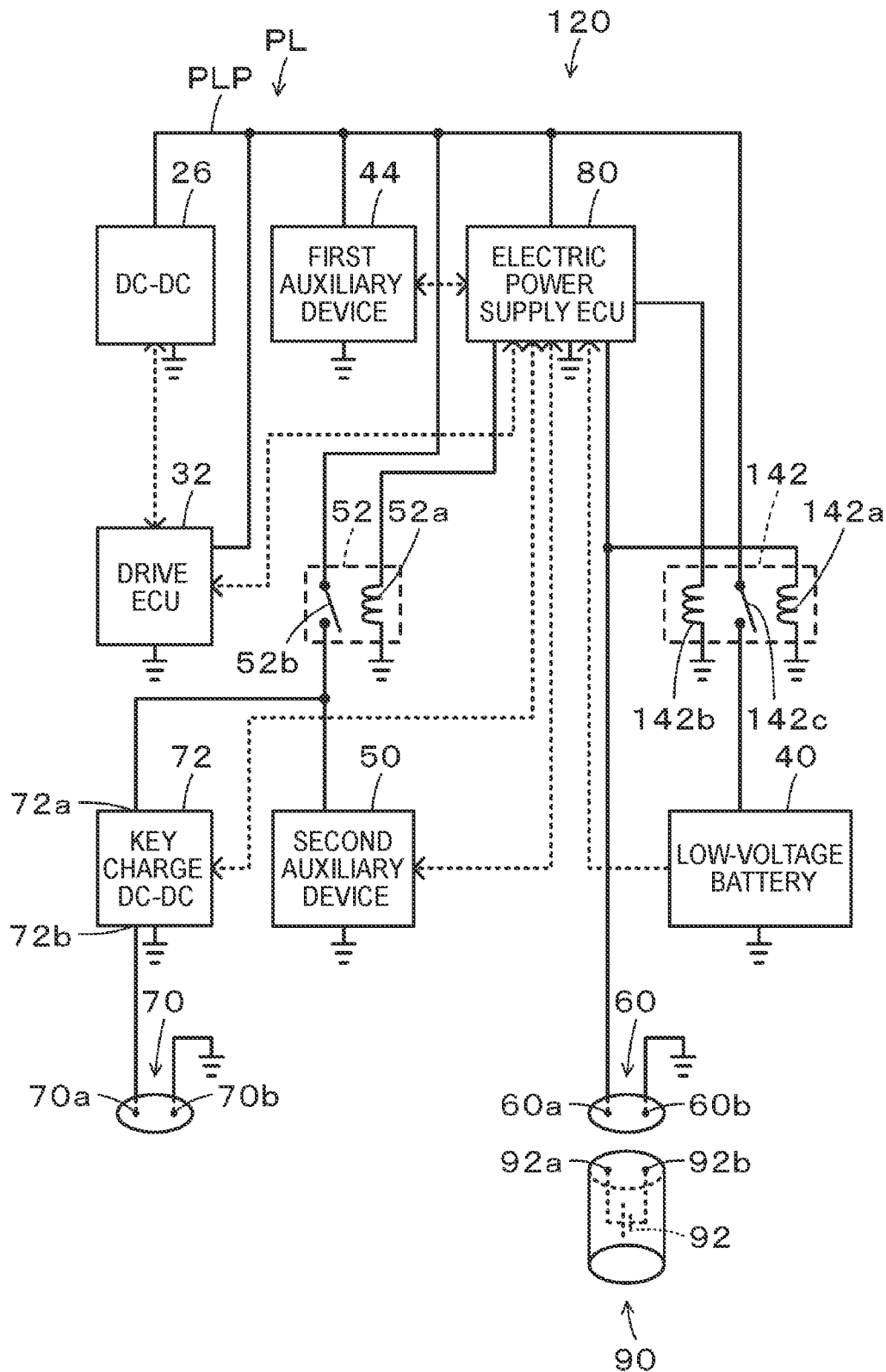
FIG. 7 is a configuration view showing the outline of the configuration of an automobile 120 according to a modification example.

The automobile 120 shown in FIG. 7 includes the same hardware configuration as the automobile 20 shown in FIG. 1, except in that the main electric power supply relay 142 is used instead of the main electric power supply relay 42. Accordingly, identical or similar components of the automobile 120 shown in FIG. 7 and the automobile 20 shown in FIG. 1 are denoted by the same reference symbols respectively, and the detailed description thereof will be omitted. Besides, those components of the automobile 120 shown in FIG. 7 which are located on a high voltage side with respect to the DC-DC converter 26 (the motor 22, the inverter 23, the high-voltage battery 24, the DC-DC converter 26, the high voltage-side electric power line PH, and the system main relay 28) are not depicted either.

The main electric power supply relay 142 of the automobile 120 is configured as a latching electromagnetic relay, and includes coils 142a and 142b and an operation portion 142c. The coil 142a is connected at one end thereof to the electric power supply ECU 80 and the positive electrode terminal 60a of the key slot 60, and is grounded at the other end thereof to the vehicle body. The coil 142b is connected at one end thereof to the electric power supply ECU 80, and is grounded at the other end thereof to the vehicle body. The operation portion 142c connects the positive electrode terminal of the low-voltage battery 40 and the positive electrode line PLP of the low voltage-side electric power line PL to each other when the coil 142a shifts from its non-energized state to its energized state, holds the positive electrode terminal of the low-voltage battery 40 and the positive electrode line PLP of the low voltage-side electric power line PL connected to each other even when the coil 142a shifts from its energized state to its non-energized state afterward, disconnects the positive electrode terminal of the low-voltage battery 40 and the positive electrode line PLP of the low voltage-side electric power line PL from each other when the coil 142b shifts from its non-energized state to its energized state afterward, and holds the positive electrode terminal of the low-voltage battery 40 and the positive electrode line PLP of the low voltage-side electric power line PL disconnected from each other even when the coil 142b shifts from its energized state to its non-energized state afterward. The electric power supply ECU 80 of the automobile 120 controls the changeover in the on and off state of the main electric power supply relay 42 by selectively shifting each of the coils 142a and 142b from its non-energized state to its energized state.

The automobile 20 according to the embodiment includes the key slot 70 and the key charge DC-DC converter 72, as the electric power feed unit that is configured to feed electric power to the smart key 90 (the storage battery 92). However, the key slot 70 and the key charge DC-DC converter 72 may not be provided.

Figure 8:
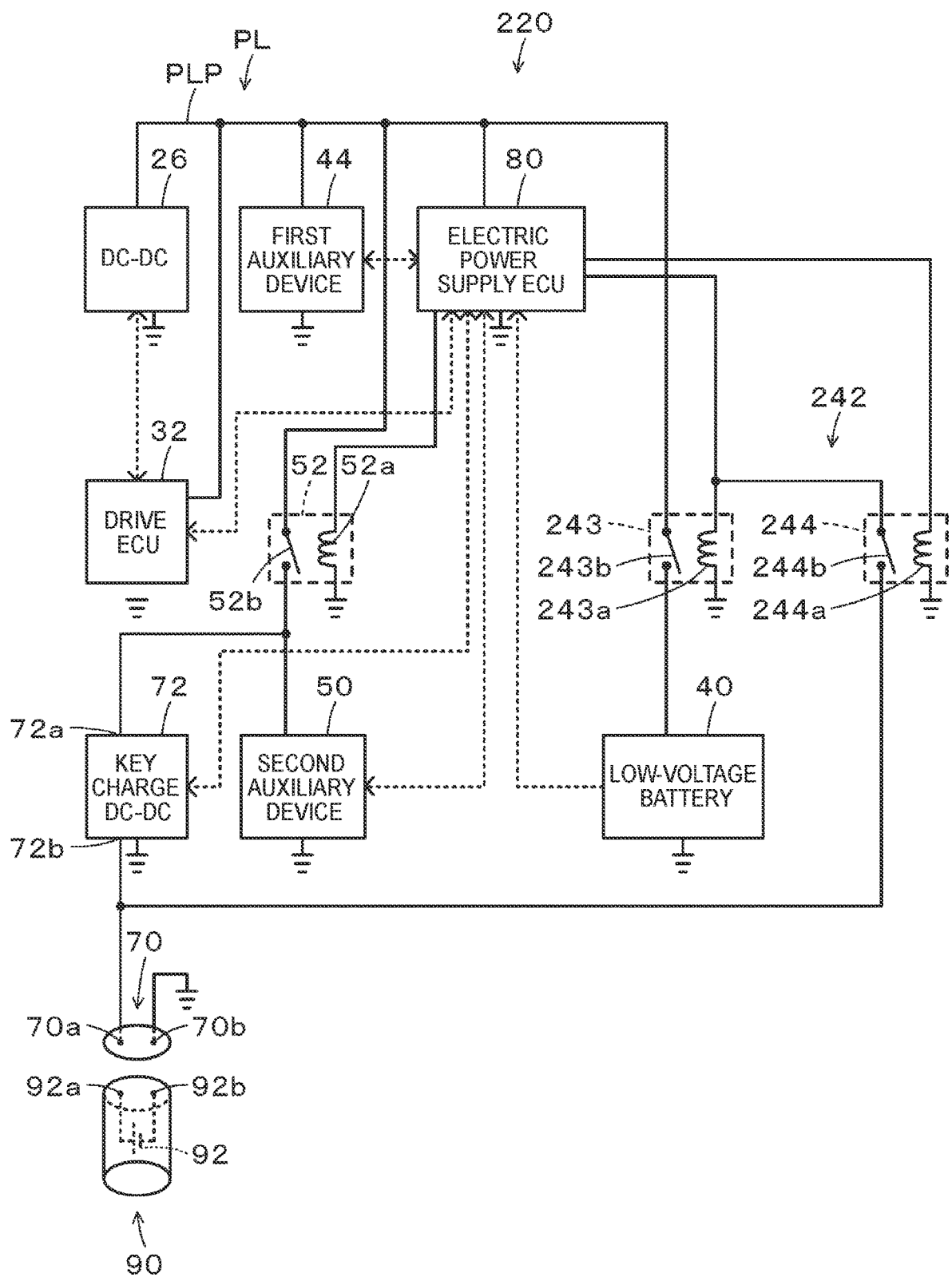
FIG. 8 is a configuration view showing the outline of the configuration of an automobile 220 according to another modification example.

The automobile 20 according to the embodiment is configured as shown in FIG. 1, but may be configured as an automobile 220 according to a modification example of FIG. 8. The automobile 220 shown in FIG. 8 includes the same hardware configuration as the automobile 20 shown in FIG. 1, except in that the key slot 60 outside the vehicle cabin is not provided, that a main electric power supply relay 242 is used instead of the main electric power supply relay 42, and that the main electric power supply relay 242 and the key slot 70 inside the vehicle cabin are connected to each other. Accordingly, identical or similar components of the automobile 220 shown in FIG. 8 and the automobile 20 shown in FIG. 1 are denoted by the same reference symbols respectively, and the detailed description thereof will be omitted. Besides, those components of the automobile 220 shown in FIG. 8 which are located on the high voltage side with respect to the DC-DC converter 26 (the motor 22, the inverter 23, the high-voltage battery 24, the DC-DC converter 26, the high voltage-side electric power line PH, and the system main relay 28) are not depicted either.

The main electric power supply relay 242 of the automobile 220 includes a first relay 243 and a second relay 244. The first relay 243 is configured as a ratchet electromagnetic relay, and connects and disconnects the positive electrode terminal of the low-voltage battery 40 and the positive electrode line PLP of the low voltage-side electric power line PL to and from each other by being turned on and off. This first relay 243 includes a coil 243a and an operation portion 243b. The coil 243a is connected at one end thereof to the electric power supply ECU 80, and is grounded at the other end thereof to the vehicle body. The operation portion 243b connects the positive electrode terminal of the low-voltage battery 40 and the positive electrode line PLP of the low voltage-side electric power line PL to each other when the coil 243a shifts from its non-energized state to its energized state, holds the positive electrode terminal of the low-voltage battery 40 and the positive electrode line PLP of the low voltage-side electric power line PL connected to each other even when the coil 243a shifts from its energized state to its non-energized state afterward, disconnects the positive electrode terminal of the low-voltage battery 40 and the positive electrode line PLP of the low voltage-side electric power line PL from each other when the coil 243a shifts from its non-energized state to its energized state afterward, and holds the positive electrode terminal of the low-voltage battery 40 and the positive electrode line PLP of the low voltage-side electric power line PL disconnected from each other even when the coil 243a shifts from its energized state to its non-energized state afterward.

The second relay 244 is configured as a ratchet electromagnetic relay, and connects and disconnects the electric power supply ECU 80 and one end of the coil 243a (on the electric power supply ECU 80 side) to and from the positive electrode terminal 70*a* of the key slot 70 and the first positive electrode terminal 72*a* of the key charge DC-DC converter 72 by being turned on and off. This second relay 244 includes a coil 244*a* and an operation portion 244*b*. The coil 243*a* is connected at one end thereof to the electric power supply ECU 80, and is grounded at the other end thereof to the vehicle body. The operation portion 244*b* connects the electric power supply ECU 80 and one end of the coil 243*a* (on the electric power supply ECU 80 side) to the positive electrode terminal 70*a* of the key slot 70 and the second positive electrode terminal 72*b* of the key charge DC-DC converter 72 when the coil 244*a* shifts from its non-energized state to its energized state, holds the electric power supply ECU 80 and one end of the coil 243*a* connected to the positive electrode terminal 70*a* of the key slot 70 and the second positive electrode terminal 72*b* of the key charge DC-DC converter 72 even when the coil 244*a* shifts from its energized state to its non-energized state afterward, disconnects the electric power supply ECU 80 and one end of the coil 243*a* (on the electric power supply ECU 80 side) from the positive electrode terminal 70*a* of the key slot 70 and the second positive electrode terminal 72*b* of the key charge DC-DC converter 72 when the coil 244*a* shifts from its non-energized state to its energized state afterward, and holds the electric power supply ECU 80 and one end of the coil 243*a* disconnected from the positive electrode terminal 70*a* of the key slot 70 and the second positive electrode terminal 72*b* of the key charge DC-DC converter 72 even when the coil 244*a* shifts from its energized state to its non-energized state afterward.

The electric power supply ECU 80 of the automobile 220 controls the changeover in the on and off state of the first relay 243 by shifting the coil 243*a* of the main electric power supply relay 242 from its non-energized state to its energized state, and controls the changeover in the on and off state of the second relay 244 by shifting the coil 244*a* from its non-energized state to its energized state.

Figure 9:
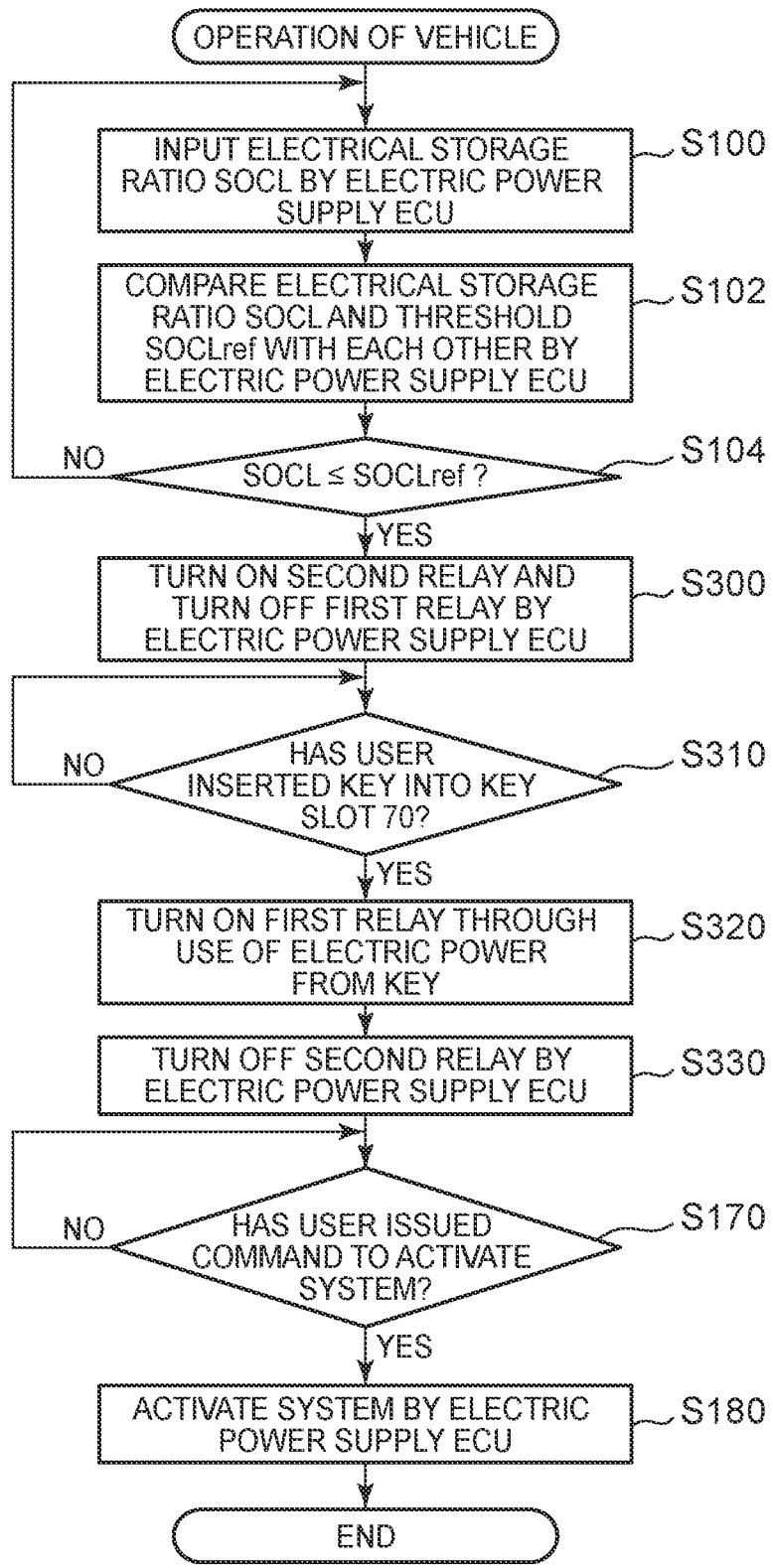
FIG. 9 is an illustrative view for illustrating the flow of operation of the automobile 220 after the automobile 220 is parked thereof.

Next, the operation of the automobile 220 according to this modification example thus configured, especially the operation of the automobile 220 that has been parked and left unattended for a long time will be described. FIG. 9 is an illustrative view for illustrating the flow of operation of the automobile 220 after the automobile 220 is parked thereof. The illustrative view of FIG. 9 is identical to FIG. 4 except in that the processing of steps S300 to S330 is performed instead of the processing of steps S110 to S130, and that the processing of steps S140 to S160 is not performed. Accordingly, like processing steps are denoted by like step numbers, and the detailed description thereof will be omitted. Incidentally, at the beginning of the flow of operation of the automobile 220 shown in FIG. 9, the first relay 243 of the main electric power supply relay 242 is on, and the second relay 244 thereof is off.

In the flow of operation of the automobile 220 shown in FIG. 9, if the electrical storage ratio SOCL of the low-voltage battery 40 is equal to or lower than the threshold SOCLref in steps S102 and S104, the electric power supply ECU 80 turns on the second relay 244 of the main electric power supply relay 242, and turns off the first relay 243 thereof (step S300). Each of the first relay 243 and the second relay 244 is configured as a ratchet electromagnetic relay. Therefore, the second relay 244 is turned on through the shifting of the coil 244*a* from its non-energized state to its energized state by the electric power supply ECU 80, and the first relay 243 is turned off through the shifting of the coil 243*a* from its non-energized state to its energized state by the electric power supply ECU 80.

When the second relay 244 is thus turned on, the electric power supply ECU 80 and one end of the coil 243*a* (on the electric power supply ECU 80 side) are connected to the positive electrode terminal 70*a* of the key slot 70 and the second positive electrode terminal 72*b* of the key charge DC-DC converter 72. Besides, when the first relay 243 is turned off, the positive electrode terminal of the low-voltage battery 40 and the positive electrode line PLP of the low voltage-side electric power line PL are disconnected from each other, and electric power is stopped from being fed from the low-voltage battery 40 to the positive electrode line PLP of the low voltage-side electric power line PL, namely, from being fed to the DC-DC converter 26, the drive ECU 32, the first auxiliary device 44, the electric power supply ECU 80, and the like. By stopping electric power from being fed to the electric power supply ECU 80, the coils 243*a* and 244*a* are also rendered in their non-energized states, but the first relay 243 is held off, and the second relay 244 is held on.

After that, when the user mechanically unlocks the doors through the use of the smart key 90 and gets on the automobile, and the smart key 90 is inserted into the key slot 70 so that the positive electrode terminal 92*a* and the negative electrode terminal 92*b* of the smart key 90 come into contact with the positive electrode terminal 70*a* and the negative electrode terminal 70*b* of the key slot 70 respectively (step S310), the first relay 243 is turned on (step S320). Now that the second relay 244 is on and the electric power supply ECU 80 and one end of the coil 243*a* (on the electric power supply ECU 80 side) are connected to the positive electrode terminal 70*a* of the key slot 70 and the second positive electrode terminal 72*b* of the key charge DC-DC converter 72, the first relay 243 is turned on by applying the voltage of the storage battery 92 of the smart key 90 to the coil 243*a* of the first relay 243 to shift the coil 243*a* from its non-energized state to its energized state.

When the first relay 243 is thus turned on, the positive electrode terminal of the low-voltage battery 40 and the positive electrode line PLP of the low voltage-side electric power line PL are connected to each other, and electric power is fed from the low-voltage battery 40 to the positive electrode line PLP of the low voltage-side electric power line PL, namely, to the DC-DC converter 26, the drive ECU 32, the first auxiliary device 44, the electric power supply ECU 80, and the like. Thus, the drive ECU 32 and the electric power supply ECU 80 are activated.

Upon being activated, the electric power supply ECU 80 turns off the second relay 244 of the main electric power supply relay 242 (step S330). Then, the processing of steps S170 and S180, which are similar to the flow of operation of the automobile 20 shown in FIG. 4, is performed, and the flow of operation of the automobile 220 shown in FIG. 9 comes to an end. The second relay 244 is turned off through the shifting of the coil 244*a* from its non-energized state to its energized state by the electric power supply ECU 80. When the second relay 244 is thus turned off, the electric power supply ECU 80 and one end of the coil 243*a* (on the electric power supply ECU 80 side) are disconnected from the positive electrode terminal 70*a* of the key slot 70 and the second positive electrode terminal 72*b* of the key charge DC-DC converter 72.

In this modification example, the second relay 244 of the main electric power supply relay 242 is turned on before turning off the first relay 243 thereof. Thus, even in the case where the first relay 243 of the main electric power supply relay 242 is turned off and the drive ECU 32, the electric power supply ECU 80, and the like is stopped, when the user inserts the smart key 90 into the key slot 70, the first relay 243 is turned on through the use of the electric power of the storage battery 92 provided in the smart key 90, and the drive ECU 32 and the electric power supply ECU 80 are activated. Thus, the system can be activated. That is, even in the case where the automobile 20 has been left unattended for a long time, the system can be easily activated without requesting support from the operator or connecting the battery of the own vehicle to a battery of another vehicle (a rescue vehicle).

Figure 10:
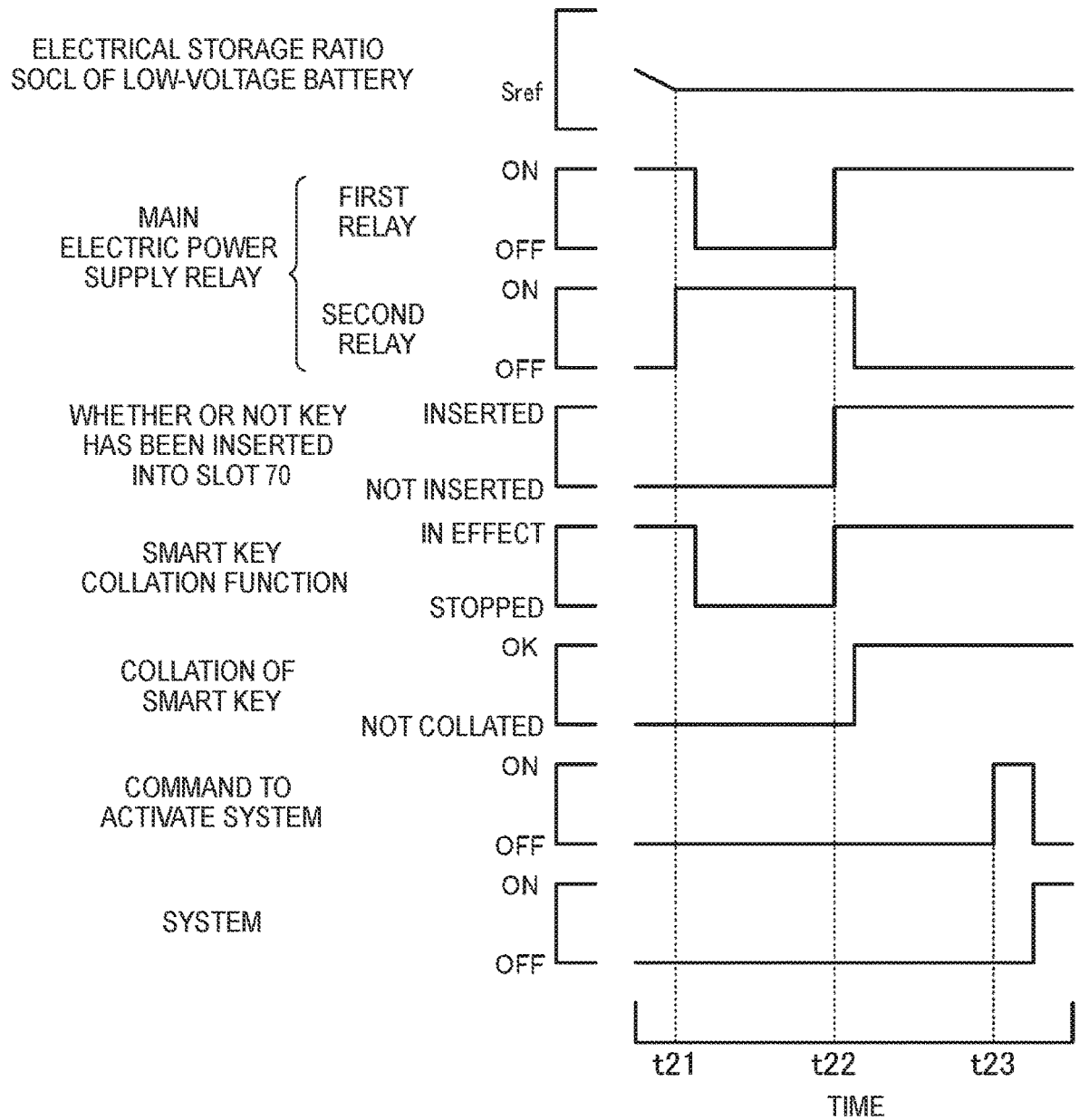
FIG. 10 is an illustrative view showing an example of how a system of the automobile 220 is activated after the automobile 220 has been left unattended for a long time.

FIG. 10 is an illustrative view showing an example of how the system of the automobile 220 is activated after the automobile 220 has been left unattended for a long time. As shown in the drawing, when the electrical storage ratio SOCL of the low-voltage battery 40 becomes equal to or lower than the threshold SOCLref after the automobile 220 has been left unattended for a long time (at a timing t21), the electric power supply ECU 80 turns on the second relay 244 of the main electric power supply relay 242, and then turns off the first relay 243 thereof. When the first relay 243 is turned off, the electric power supply ECU 80 (including the smart key collation function) is stopped. After that, when the user mechanically unlocks the doors through the use of the smart key 90 and gets on the automobile, and the smart key 90 is inserted into the key slot 70 inside the vehicle cabin (at a timing t22), the first relay 243 is turned on due to the electric power of the storage battery 92 of the smart key 90, and the drive ECU 32 and the electric power supply ECU 80 are activated. Upon being activated, the electric power supply ECU 80 turns off the second relay 244, and collates the key-side ID and the vehicle-side ID with each other through the smart key collation function. Then, in the case where the result of collation is acceptable, when the user issues a command to activate the system (at a timing t23), the drive ECU 32 and the electric power supply ECU 80 activate the system.

When the system is thus activated, the electric power supply ECU 80 executes the key charge routine of FIG. 6, as is the case with the automobile 20 according to the embodiment. Thus, the smart key 90 can be charged. Incidentally, at this moment, the second relay 244 of the main electric power supply relay 242 is off, and the electric power supply ECU 80 and one end of the coil 243a (on the electric power supply ECU 80 side) are disconnected from the positive electrode terminal 70a of the key slot 70 and the second positive electrode terminal 72b of the key charge DC-DC converter 72.

In the automobile 220 according to this modification example, a ratchet electromagnetic relay is used as each of the first relay 243 and the second relay 244 of the main electric power supply relay 242. Besides, a latching electromagnetic relay may be used instead. In this case, it is possible to reason in the same manner as in the case where the main electric power supply relay 42 of the automobile 20 shown in FIG. 1 is replaced with the main electric power supply relay 142 of the automobile 120 shown in FIG. 7.

Figure 11:
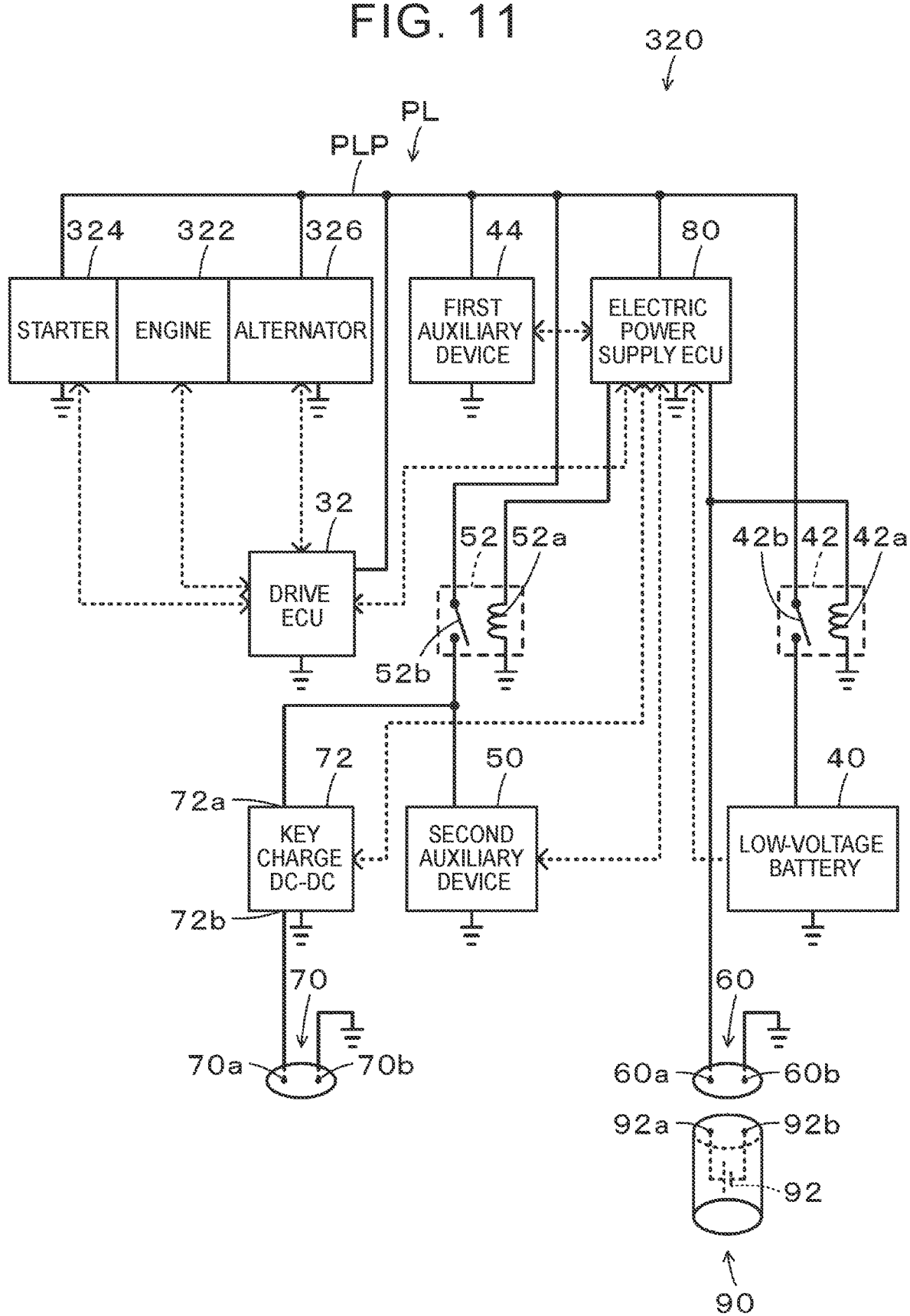
FIG. 11 is a configuration view showing the outline of the configuration of an automobile 320 according to still another modification example.

As shown in FIG. 1, the automobile 20 according to the embodiment is configured as an electric automobile or a hybrid automobile. However, the configuration of an automobile 320 according to a modification example of FIG. 11 may be adopted. The automobile 320 shown in FIG. 11 includes the same hardware configuration as the automobile 20 shown in FIG. 1, except in that an engine 322, a starter 324, and an alternator 326 are provided instead of the motor 22, the inverter 23, the high-voltage battery 24, the DC-DC converter 26, the high voltage-side electric power line PH, and the system main relay 28 of the automobile 20 shown in FIG. 1. Accordingly, identical or similar components of the automobile 320 shown in FIG. 11 and the automobile 20 shown in FIG. 1 are denoted by the same reference symbols respectively, and the detailed description thereof will be omitted.

In the automobile 320, the engine 322 is configured as an internal combustion engine that outputs motive power using gasoline, light oil, or the like as fuel. The starter 324 is connected to a crankshaft of the engine 322 via a gear mechanism. A positive electrode terminal of the starter 324 is connected to the positive electrode line PLP of the low voltage-side electric power line PL, and a negative electrode terminal of the starter 324 is grounded to the vehicle body. It should be noted herein that the gear mechanism includes an engine-side gear that is attached to the crankshaft of the engine 322, a starter-side gear that is attached to a rotary shaft of the starter 324, and an actuator that realizes and cancels the meshing of the engine-side gear and the starter-side gear. Incidentally, instead of the gear mechanism, a one-way clutch may be provided between the engine 322 and the starter 324. The alternator 326 is connected to the crankshaft of the engine 322 via the gear mechanism or a belt mechanism. A positive electrode terminal of the alternator 326 is connected to the positive electrode line PLP of the low voltage-side electric power line PL, and a negative electrode terminal of the alternator 326 is grounded to the vehicle body.

In this automobile 320, signals from various sensors that detect states of the engine 322, the starter 324, the alternator 326, and the like are input to the drive ECU 32 via the input ports thereof respectively. Various control signals to the engine 322, the starter 324, the alternator 326, and the like are output from the drive ECU 32 via the output ports thereof respectively.

The automobile 320 according to this modification example can also exert an effect similar to that of the automobile 20 according to the embodiment, by including the key slot 60 (the positive electrode terminal 60a and the negative electrode terminal 60b) and the key slot 70 (the positive electrode terminal 70a and the negative electrode terminal 70b). Incidentally, in activating a system of the automobile 320, for example, the drive ECU 32 controls the engine 322 and the starter 324, and starts up the engine 322.

The automobile 320 according to this modification example is configured to include the engine 322, the starter 324, and the alternator 326 instead of the motor 22, the inverter 23, the high-voltage battery 24, the DC-DC converter 26, the high voltage-side electric power line PH, and the system main relay 28 of the automobile 20 shown in FIG. 1. However, the automobile 320 may be configured to include the engine 322, the starter 324, and the alternator 326 instead of the motor 22 (not shown), the inverter 23 (not shown), the high-voltage battery 24 (not shown), the DC-DC converter 26 (not shown), the high voltage-side electric power line PH (not shown), and the system main relay 28 (not shown) of the automobiles 120 and 220 shown in FIGS. 7 and 8 respectively.

Each of the automobiles 20, 120, and 320 according to the embodiment and the modification examples includes the key slot 60 that is provided outside the vehicle cabin and into which the smart key 90 is inserted, as the electric power reception unit that is configured to receive, from the smart key 90 (the storage battery 92), electric power for turning on the main electric power supply relay 42. Besides, the automobile 220 according to the modification example includes the key slot 70 that is provided inside the vehicle cabin and into which the smart key 90 is inserted, as the electric power reception unit that is configured to receive, from the smart key 90, electric power for turning on the electric power supply relay 242. However, instead of or in addition to the aforementioned configuration, the automobile 220 according to the modification example may have at least one of a placement portion that is provided inside the vehicle cabin and onto which the smart key 90 is placed, and a non-contact electric power reception portion that is configured to receive electric power from the smart key 90 in a non-contact manner, as the electric power reception unit that is configured to receive, from the smart key 90, electric power for turning on the main electric power supply relay 42 or the main electric power supply relay 242. It should be noted herein that the placement portion is provided around the driver seat as indicated by, for example, the region surrounded by the broken line in FIG. 3. The non-contact electric power reception portion is provided around the door handle as indicated by, for example, the region surrounded by the broken line in FIG. 2, or is provided around the driver seat as indicated by, for example, the region surrounded by the broken line in FIG. 3.

Each of the automobiles 20, 120, 220, and 320 according to the embodiment and the modification examples uses the smart key 90 as a portable device that includes the storage battery 92 provided therein, that is portable, and that is configured to authenticate the user of the vehicle and feed electric power to the vehicle. Instead of the aforementioned smart key 90, a smartphone, a tablet terminal or the like may be used. Besides, a portable device that is configured to carry out at least one of the authentication of the user of the vehicle and the issuance of a command to activate the system of the vehicle may be used.

A corresponding relationship between the main elements of the embodiment and the main elements of the disclosure described in the section of means for solving the problem will be described. In the embodiment, the key slot 60 is an example of "the electric power reception unit". Besides, the key slot 70 is an example of "the electric power feed unit" or "the electric power reception unit". Furthermore, the low-voltage battery 40 is an example of "the in-vehicle electrical storage device", the system main relay 28, the drive ECU 32, the subsidiary electric power supply relay 52, and the electric power supply ECU 80 constitute an example of "the activation unit", and the main electric power supply relay 42 is an example of "the relay".

Incidentally, since the embodiment is an example for concretely illustrating the mode for carrying out the disclosure described in the section of means for solving the problem, the corresponding relationship between the main elements of the embodiment and the main elements of the disclosure described in the section of means for solving the problem does not limit the elements of the disclosure described in the section of means for solving the problem. That is, the disclosure described in the section of means for solving the problem should be interpreted based on what is described in the section, and the embodiment is nothing more than a concrete example of the disclosure described in the section of means for solving the problem.

Although the mode for carrying out the disclosure has been described above through the use of the embodiment, the disclosure should not be limited at all to this embodiment, but can be carried out, as a matter of course, in various modes within such a range as not to depart from the gist of the disclosure.

The disclosure can be utilized in a vehicle manufacturing industry and the like.

What is claimed is:

1. A vehicle comprising:
    an electric power reception unit that is configured to receive electric power that is required to turn on an electric power supply relay, from a portable device that is portable, the portable device including an electrical storage device provided therein, and the portable device being configured to carry out authentication of a user of the vehicle and issuance of a command to activate a system of the vehicle,
    wherein the electric power reception unit includes an exterior insertion portion which is provided outside a vehicle cabin and into which the portable device is inserted, an interior insertion portion which is provided inside the vehicle cabin and into which the portable device is inserted, a placement portion which is provided inside the vehicle cabin at a portion between a driver seat and a passenger seat and onto which the portable device is placed, and a non-contact electric power reception portion that is configured to receive the electric power from the portable device in a non-contact manner.

2. The vehicle according to claim 1, wherein
    the electric power reception unit is configured to receive the electric power from the portable device and feed the electric power to the portable device.

3. The vehicle according to claim 1, further comprising:
    an electric power feed unit that is configured to feed the electric power to the portable device.

4. The vehicle according to claim 1, further comprising:
    an in-vehicle electrical storage device;
    an activation unit that is configured to activate the system; and
    a relay that connects and disconnects the in-vehicle electrical storage device and the activation unit to and from each other by being turned on and off, wherein
    the electric power reception unit is configured to receive, from the portable device, the electric power for turning on the relay.

5. The vehicle according to claim 1, wherein the non-contact electric power reception portion is provided adjacent to a door handle on the outside of the vehicle.

6. The vehicle according to claim 1, further comprising:
    an in-vehicle electrical storage device; and
    an electric control unit configured to activate the system of the vehicle,
    wherein the electric power supply is configured to connect the in-vehicle electrical storage device.

* * * * *